3,110,735
PROCESS FOR THE PREPARATION OF
TROPYLIUM SALTS
Arne P. ter Borg, Robert van Helden, and Albert F. Bickel, Amsterdam, Netherlands, assignors to Shell Oil Company, New York, N.Y., a corporation of Delaware
No Drawing. Filed May 25, 1962, Ser. No. 197,607
Claims priority, application Netherlands Nov. 2, 1961
4 Claims. (Cl. 260—606.5)

This invention relates to a novel process for the preparation of tropylium salts and substituted tropylium salts.

More particularly, the present invention relates to a process for the preparation of tropylium salts by the autoxidation of cycloheptatriene, or a substituted cycloheptatriene, whose methylene group carries at most one substituent in the presence of certain transition metal ions such as a divalent and/or trivalent iron ion.

A process for preparing tropylium salts is disclosed in copending U.S. patent application Serial No. 34,607, filed June 8, 1960. It has now been found that the yields of tropylium salts may be increased, and the presence of undesirable polymeric side products substantially eliminated by conducting the autoxidation reaction in the presence of iron ions. In addition, by conducting the autoxidation reaction in an acid medium which contains a catalytic amount of iron ions, it is possible to operate the process without the use of a large excess of the cycloheptatriene compound. By "tropylium salts" is meant both substituted and unsubstituted tropylium compounds.

The proces of the present invention thus comprises the preparation of tropylium salts by contacting a substituted or unsubstituted cycloheptatriene compound whose methylene group carries at most one substituent in an acid medium with oxygen, a substance which releases oxygen in the reaction medium, or an oxygen-containing gas in the presence of at least a catalytic amount of iron ions.

The starting triene compound to be used may be either cycloheptatriene itself or it may be a substituted cycloheptatriene. Thus, the starting material can be described as a compound of the formula:

(I)

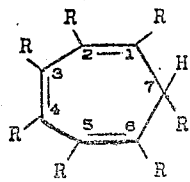

wherein each R is individually selected from the group consisting of the hydrogen atom, the halogen atoms (especially the middle halogens, Br and Cl), the alkyl radical, the aryl radical, the alkaryl radical, and the aralkyl radical. It is preferred that each R substituent contain no more than 10 carbon atoms. When R is an alkyl group, lower alkyl radicals such as methyl, ethyl, n-propyl, isopropyl, n-butyl, isobutyl, sec.-butyl, and tertiary butyl are preferred. Other functional substituents that are inert under the conditions of this process may also be present on the cycloheptatriene ring such as —OH, $NO_2$, and —COOH. It will be obvious to those skilled in the art that the starting compound to be used will be determined by the product that is desired. If a tropylium salt having a particular substituent on the ring is desired, the corresponding cycloheptatriene having this desired substituent should be taken as the starting material. Cycloheptatriene compounds with from 7 to 60 carbon atoms (preferably from 7 to 35 carbon atoms) may be used. A representative group of suitable starting compounds would include among others: 1,3,5-cycloheptatriene, 1-methyl-1,3,5-cycloheptatriene, 1,7 - diethyl-1,3,5-cycloheptatriene, 3-isopropyl-cycloheptatriene, 3-phenyl - 1,3,5 - cycloheptatriene, 2,4-dichloro-1,3,5-cycloheptatriene, 3-bromo-4-ethylphenyl - 1,3,5 - cycloheptatriene, 1,3,5-trifluoro-1,3,5-cycloheptatriene, 5 - phenylmethyl-6-iodo-1,3,5-cycloheptatriene, 5-phenylethyl-1,3,5-cycloheptatriene, and 2,4,6-trimethyl-1,3,5-cycloheptatriene.

The tropylium salts of these compounds are all prepared in a similar manner. For example, 3-isopropyl-cycloheptatrienyl salts such as the perchlorate or tetrafluoroborate are prepared by reacting 3-isopropylcycloheptatriene with oxygen in either perchloric acid or tetrafluoroboric acid (with or without acetic acid) in the presence of ferrous or ferric ions.

From the foregoing examples, it is clear that a great variety of cycloheptatriene compounds may be used in the process of the invention. However, it should be pointed out that not more than one hydrogen atom in the methylene group (i.e., number seven carbon atom in the structure I) of the 1,3,5-cycloheptatriene nucleus should be substituted.

Unsubstituted cycloheptatriene is the preferred material for use in the process of the present invention because it is readily available as a starting material. Cycloheptatriene may be conveniently prepared by the thermal isomerization of bicyclo[2.2.1]-2,5-heptadiene as disclosed in U.S. Patent No. 2,754,337 to Joseph S. Chirtel and Walter M. Halper, issued July 10, 1956. The technical cycloheptatriene by-product obtained from this process contains small quantities of toluene and methylbicycloheptatriene.

The chemical reaction involved in the process of the present invention may be described as an autoxidation reaction because it does not require any special oxidizing agent other than atmospheric oxygen. The reaction may be represented by the following equation wherein the R groups are as defined in Formula I:

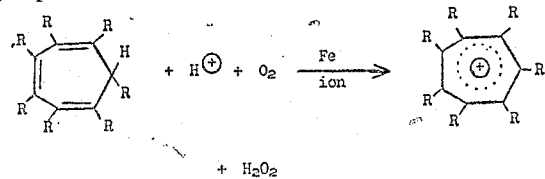

The tropylium ion produced as a result of the preceding reaction is recovered from the reaction mixture in the form of a salt of one of the acids employed in the acid medium. Or a compound which yields an anion which forms an insoluble tropylium salt may be added to the reaction medium. Molecular oxygen is the preferred oxidizing agent, but other oxidizing agents with two oxygen atoms, or compounds which liberate molecular oxygen in the reaction medium may be used. The autoxidation may be brought about by means of oxygen or an oxygen-containing gas, in particular, air. In such cases the autoxidation may very well be carried out at oxygen partial pressures of from 0.2 to 2.0 atmospheres (absolute). The yields generally increase with increasing pressure. Oxygen partial pressures of more than two atmospheres may therefore often be advantageous. Lower pressures (less than 0.2 atmosphere) may be used if yields are not important. Pressures as low as .05 atmosphere may be expected to give only small amounts of tropylium ions.

Only trace amounts of iron ions are required in the process of the present invention. The influence of iron on the tropylium salt formation is apparent from Table I which shows that the presence of 1.44 millimoles of iron per liter (added as hydrated ferrous sulfate) requires the use of only a two-fold excess of cycloheptatriene to produce substantial yields of tropylium salt (based on the acid).

TABLE I.—FORMATION OF TROPYLIUM SALT VERSUS CYCLOHEPTATRIENE CONSUMPTION

| Intake | | | Tropylium Salt Formed | |
| --- | --- | --- | --- | --- |
| HClO₄ Moles | HBF₄ Moles | C₇H₈ Moles | Moles | Percent (Based on Acid) |
| .60 | | 2.40 | .40 | 66.7 |
| | 1 5.00 | 10.0 | 2.88 | 57.6 |

¹ FeSO₄.7H₂O (1.44 mmoles/liter) added as catalyst.

In general, only a catalytic amount of iron ions (either as ferrous, ferric, or mixtures of ferrous and ferric) is necessary in the process of the present invention. The recommended iron content of the reaction medium may vary from a trace amount to not more than 30 milligrams of iron ions per liter. Beyond this amount it has been found that the rate of the reaction declines, and at higher concentration the oxidation is even inhibited.

In carrying out the oxidation, however, the reaction rate, especially at the beginning, is very high even with relatively low iron concentrations. This is also the case when there is no iron at all. With increasing iron concentration, the initial rate of reaction becomes considerably lower, apparently owing to the influence of an induction effect. As the heat of reaction is fairly high, being more than 55 kcal./mole, at low iron concentrations very large quantities of heat will have to be removed in a very short time (usually within a few minutes). At higher iron concentrations, however, the heat liberated is spread over a longer interval of time. This is often more advantageous because then the cooling system need not meet such heavy requirements to be efficient and the reaction is more easily controlled.

It has been found that excellent results are achieved if the oxidation of the cycloheptatriene compound concerned is carried out in an acid medium containing not more than 7.5 mg. of iron ions per liter. The content of iron ions may be from .0025 mg. to 3.0 mg. per liter, and preferably from 0.025 to 0.30 mg. of iron per liter of the reaction mixture.

The iron ions utilized in the process of the present invention may originate from organic or inorganic iron compounds or from metallic iron and/or alloys containing iron. Generally, a solution of an iron compound in the reaction mixture, or in one or more of the components of the reaction mixture, is employed. For instance, a solution of an iron salt in an acid or in a mixture of acids may be used. It is also possible to dissolve filings or a powder of metallic iron or of an iron alloy in the reaction mixture, the acid, or in the acid mixture. If necessary, the said solutions may be further diluted and/or mixed with the other reaction components. If desired, the iron may be added in the form of a compound from which the iron ions are not liberated until the reaction conditions are applied, for example, a complex compound such as that of phenanthroline and Fe⁺⁺. It is preferable to use a salt that is readily soluble in the reaction mixture. The valence of the iron ions is not critical. Very favorable results are obtained with ferric chloride (FeCl₃) and with hydrated ferrous sulfate (FeSO₄.7H₂O). Double salts such as Mohr's salt (FeSO₄.(NH₄)₂SO₄.6H₂O) and salts of organic acids (such as ferric or ferrous acetate) may be employed. Iron chelates which contain only a slight amount of ferrous or ferric ions in equilibrium with the chelate compound may be used. Thus, it is immaterial what the source of the iron (ferric or ferrous) ions may be. Ordinarily, the iron ions will be derived from an iron-containing compound or mixture of compounds. However, iron ions may also be produced electrolytically, or iron metal may be dissolved in the acidic reaction mixture.

The autoxidation of the present invention is performed in an acid medium. It has been found that in a neutral medium no oxidation occurs. Higher yields of tropylium ion are obtained as the concentration of the acid is increased. The yield of tropylium ion obtained, however, is not a linear function of the acid strength because other concurrent reactions occur (such as epoxidation at the double bonds). As a rule the autoxidation reaction is allowed to proceed in a medium consisting of one or more liquid acids in which an iron salt (ferrous or ferric) has been dissolved. If desired, solvents, diluents, dispersing agents and the like may also be present as long as the final reaction medium is acidic. Hydrocarbon solvents such as toluene or xylene are very suitable.

The acid medium in which the reaction is allowed to take place preferably contains acetic acid, a halogenated acetic acid, such as trifluoroacetic acid, trichloroacetic acid, or mixtures of these acids.

The reaction is preferably carried out in the absence of water, or at least in the presence of only a small amount of water. The presence of water is ordinarily avoided because water, being more basic than cycloheptatriene, tends to withdraw protons from the reaction and consequently slows down the reaction.

The process of the present invention can be performed in a particularly advantageous manner by choosing a reaction medium in which the tropylium salt to be prepared precipitates as it is formed. Thus, the oxidation may be carried out in the presence of an acid whose tropylium salt is insoluble. Tetrafluoroboric acid (HBF₄) and perchloric acid (HClO₄) are very suitable acids because their tropylium salts are generally insoluble or sparingly soluble. Tetrafluoroboric acid is preferred over perchloric acid because the tropylium perchlorates are apt to explode. An example of a very suitable acid mixture is an anhydrous mixture of tetrafluoroboric acid and acetic acid.

The temperatures at which autoxidation is conducted are in the range from 0° C. to 100° C., inclusive. Higher or lower temperatures (from −10° C. to 150° C.) may be employed with particular reaction media but with decreased yields of tropylium ion and/or increased polymer formation. Good results are obtained at temperatures in the range between 30° C. and 50° C. The precise temperature within these ranges depends on several factors. For example, at higher pressures more oxygen dissolves and consequently the temperature can be kept lower.

It has also been discovered that not all multi-variant transition ions have the property of catalyzing the autoxidation of cycloheptatriene compounds to tropylium salts. For example, copper (especially cupric) ions were found to inhibit the autoxidation. Other metal ions such as $Mn^{+3}$, $Mn^{+2}$, $Co^{+2}$, $Ni^{+2}$, $Cr^{+3}$, and $Ce^{+4}$ had no detectable catalytic effect.

The technical grade cycloheptatriene (92% C₇H₈ by weight) which was used as a starting material in the following examples was obtained from the bottom product in the preparation of bicyclo[2.2.1]-hepta-2,5 diene from the reaction of cyclopentadiene and acetylene (see U.S. Patent 2,754,337). The bottom product initially contained 80% by weight of cycloheptatriene. After removal of the lower boiling fractions by distillation in a column of 15 theoretical plates, a fraction boiling at 114–115.5° C. was obtained. This fraction was composed of 92% by weight of cycloheptatriene, about 4.5% by weight of toluene, and about 3.5% by weight of methylbicyclo[2.2.1]-hepta-2,5-diene. The product thus obtained was used as the base material in the examples given below. The oxidations were carried out in a reaction vessel of 10 liter capacity, fitted with a stirrer, gas feed tube, thermometer, and a funnel for introducing liquids. Heating and cooling were effected by means of a coiled tube in the reaction vessel through which water of the desired temperature was passed. When a mixture of anhydrous tetrafluoroboric acid and acetic acid is employed as the reaction medium, the mixture may be prepared by adding (in a polyethylene vessel) 100 grams (5 moles) of liquid hydrofluoric acid to 5 liters of glacial acetic acid and then passing 340 grams (5 moles) of gaseous boron trifluoride onto the solution so obtained. In view of the high solubility of $BF_3$, the gas feed tube ends above the surface of the liquid.

The tropylium salts obtained by the process of the present invention are important intermediates in the preparation of tropyl ethers which may in turn be converted to tropones. For example, tropylium salts prepared according to the present invention can be hydrolyzed to the corresponding ditropyl ether and the ether then thermally cleaved to form a tropone. The tropones can be halogenated and then hydrolyzed to form tropolones which are useful as metal deactivators and as fungicidal agents. For instance, 3-isopropyl tropolone has an activity upon wood fungi of the same order as pentachlorophenol.

Details of the process of the present invention are illustrated by the following examples. It is to be understood that these examples are offered for illustration only and are not to be construed as limiting the invention in any way.

EXAMPLE I.—PREPARATION OF TROPYLIUM TETRAFLUOROBORATE

An anhydrous solution of tetrafluoroboric acid in acetic acid (prepared as shown previously) was introduced into the reaction vessel and to it was added 2 grams of iron (II) sulfate ($FeSO_4 \cdot 7H_2O$) (1.15 mg. of Fe ions per liter of reaction mixture). The solution was heated to 44° C. and then, in an atmosphere of oxygen, while the liquid was vigorously stirred, 1 kg. (10 mole) of the previously described technical cycloheptatriene was allowed to flow into the mixture in one portion. The absorption of oxygen is very rapid at the outset, while at the end of 2.5 hours only a small amount of additional oxygen is absorbed. By cooling the temperature was maintained betwen 44° and 48° C.

After three hours the reaction mixture was cooled down to 10° C., while the tropylium tetrafluoroborate crystallized. The crystals were filtered off, washed three times with glacial acetic acid and finally dried on the filter by sucking air through. The yield was 525 g. (2.95 mole) of tropylium tetrafluoroborate, which is equivalent to 29.5% wt. as referred to cycloheptatriene.

Unconverted cycloheptatriene was recovered by diluting the filtrate with water, followed by extraction with pentane and distillation of the extract obained.

EXAMPLE II

The preparation of tropylium tetrafluoroborate was repeated but without the addition of iron sulfate. The result was 175 g. of an impure product containing a large quantity of polymeric products. These were removed by washing with benzene. The yield of pure tropylium tetrafluoroborate was then 87 g., which corresponds to 4.9% wt. as referred to cycloheptatriene.

It was found that very widely varying yields were obtained if the acid mixture was prepared in new polyethylene vessels. Reproducible results were only obtained if the polyethylene vessel had already been used for the same purpose. New polyethylene vessels were therefore invariably treated for 24 hours at room temperature with a mixture of $HBF_4$ and acetic acid before being used for the reaction for the first time.

EXAMPLE III

In the way described in Example I, 10 g. of technical cycloheptatriene (100 mmole) was reacted with oxygen and an anhydrous solution of 50 ml. of acetic acid which contained 50 mmole of $HBF_4$ and to which had been added 1 ml. of glacial acetic acid containing a quantity of iron (III) chloride. In a series of experiments carried out in the presence of various concentrations of Fe ions, the yields obtained at the end of one hour were determined and the oxygen absorption was measured. Oxidation was in all cases carried out at 46° C. and an oxygen pressure of one atmosphere absolute. The experiments were discontinued at the end of one hour. Results are recorded in the following table.

Table II

| Mg. ions Fe present per liter | $O_2$ absorbed, mmole | Yield of $C_7H_7BF_4$, mmole | Polymeric by-products |
|---|---|---|---|
| Blank | 10.4 | 8.1 | + |
| 0.0029 | 15.8 | 11.2 | + |
| 0.0144 | 30.8 | 17.3 | — |
| 0.0288 | 37.5 | 20.8 | — |
| 0.0576 | 37.5 | 20.7 | — |
| 0.288 | 37.5 | 22.5 | — |
| 2.88 | 20.8 | 17.2 | — |

From the table the favorable effect of Fe ions upon the autoxidation is evident, as is also the optimum effect reached in the case referred to at concentrations between 0.0144 and 2.88 mg. ions per liter of reaction mixture. In the experiments shown in Table II, the iron was added in the form of an acetic acid solution of ferric chloride ($FeCl_3$). A plus (+) sign indicates the presence of polymeric material; a minus (—) sign indicates the absence of polymeric material.

Similar results are obtained if an equivalent amount of perchloric acid is used in place of tetrafluoroboric acid.

We claim as our invention:

1. A process for the preparation of tropylium salts which comprises contacting:

(a) a cycloheptatriene compound of from 7 to 60 carbon atoms having the formula:

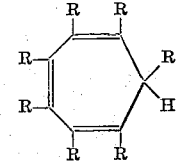

wherein each R is individually selected from the group consisting of hydrogen, alkyl, aryl, alkaryl, aralkyl, halogen, hydroxyl, nitro, and carboxyl groups and (b) oxygen in an acidic reaction medium in the presence of iron ions.

2. The process of claim 1 wherein the cycloheptatriene compound is a lower alkyl substituted cycloheptatriene.

3. The process of claim 1 wherein the cycloheptatriene compound is 1,3,5-cycloheptatriene.

4. A process for the preparation of tropylium tetrafluoroborate which comprises contacting:

(a) cycloheptatriene and (b) atmospheric oxygen in a mixture of acetic acid and anhydrous tetrafluoroboric acid containing iron ions.

No references cited.